US012286987B2

(12) United States Patent
Bartholmai et al.

(10) Patent No.: US 12,286,987 B2
(45) Date of Patent: Apr. 29, 2025

(54) METHOD FOR OPERATING AN ELECTRIC MOTOR, DELIVERY PUMP, MOTOR VEHICLE HAVING A DELIVERY PUMP OF SAID TYPE, COMPUTER PROGRAM, AND COMPUTER-READABLE MEDIUM

(71) Applicant: Vitesco Technologies GmbH, Regensburg (DE)

(72) Inventors: Bjoern Bartholmai, Munich (DE); Wolf Goetze, Munich (DE); Klemens Kieninger, Munich (DE); Matthias Fischer, Munich (DE)

(73) Assignee: Vitesco Technologies GmbH, Regensburg (DE)

( * ) Notice: Subject to any disclaimer, the term of this patent is extended or adjusted under 35 U.S.C. 154(b) by 302 days.

(21) Appl. No.: 17/955,038

(22) Filed: Sep. 28, 2022

(65) Prior Publication Data

US 2023/0103970 A1 Apr. 6, 2023

(30) Foreign Application Priority Data

Oct. 4, 2021 (DE) ..................... 10 2021 211 175.0

(51) Int. Cl.
*F15B 21/08* (2006.01)
*F15B 21/00* (2006.01)

(52) U.S. Cl.
CPC ............ *F15B 21/008* (2013.01); *F15B 21/08* (2013.01)

(58) Field of Classification Search
CPC .......... F04B 49/20; F04B 47/00; F04B 11/00; F15B 21/08
See application file for complete search history.

(56) References Cited

U.S. PATENT DOCUMENTS

2010/0021313 A1* 1/2010 Devan ..................... F04B 17/03 417/44.1
2020/0166029 A1* 5/2020 Brahmer ................. B29C 51/46

FOREIGN PATENT DOCUMENTS

| | | | |
|---|---|---|---|
| DE | 69729772 | 11/2004 | |
| DE | 102008038659 | 2/2010 | |
| DE | 102008040920 | 2/2010 | |
| DE | 102011121837 | 6/2013 | |
| DE | 102013106712 | 1/2014 | |
| DE | 102014206935 | 10/2015 | |
| DE | 102017207418 | 11/2018 | |
| DE | 102018208580 | 12/2019 | |
| DE | 102018208580 A1 * | 12/2019 | ............ B60T 13/146 |
| DE | 102019219633 | 6/2021 | |
| EP | 3800343 | 4/2021 | |

OTHER PUBLICATIONS

Office Action of corresponding German Patent Application No. 10 2021 211 175.0.

* cited by examiner

*Primary Examiner* — Abiy Teka
(74) *Attorney, Agent, or Firm* — COZEN O'CONNOR

(57) ABSTRACT

A method for operating an electric motor that drives a displacement pump stage to deliver a liquid through a hydraulic system to supply the liquid to at least one consumer. A periodically repeating pressure fluctuation of the liquid that occurs during delivery operation is at least partially compensated by virtue of the rotational speed of the electric motor being manipulated in accordance with the periodically repeating pressure fluctuation.

16 Claims, 6 Drawing Sheets

METHOD FOR OPERATING AN ELECTRIC MOTOR, DELIVERY PUMP, MOTOR VEHICLE HAVING A DELIVERY PUMP OF SAID TYPE, COMPUTER PROGRAM, AND COMPUTER-READABLE MEDIUM

BACKGROUND OF INVENTION

1. Field of the Invention

The disclosure relates to a method for operating an electric motor that drives a displacement pump stage to deliver a liquid through a hydraulic system to supply the liquid to at least one consumer. The disclosure furthermore relates to a delivery pump. The disclosure furthermore relates to a motor vehicle having at least one delivery pump of said type. The disclosure further relates to a computer program and to a computer-readable medium.

2. Description of Related Art

Due to pulsing pressure fluctuations that are caused in particular by delivery pumps with displacement pump stages, acoustically perceptible vibrations can occur in a hydraulic system in which a liquid is delivered by the displacement pump stage. If the associated undesired noises are caused specifically in a hydraulic system of a motor vehicle, this leads to a reduction in driving comfort for the vehicle occupants. Therefore, in the prior art, in the development of a hydraulic system, it is sought to dimension and design this hydraulic system such that no resonance frequencies whatsoever are excited, or no acoustically perceptible vibrations whatsoever occur during delivery operation. This is however associated with considerable complexity, which is characterized in particular by the fact that, in every vehicle model, specially dimensioned hydraulic systems must be used in order to avoid the undesired generation of noise. In other words, the use of identically dimensioned components, such as displacement pump stages, fluid lines, valves etc. is not possible universally across multiple model variants of a vehicle, which can increase the costs for such a hydraulic system.

SUMMARY OF THE INVENTION

It is the object of one aspect of the present invention to create a method for operating an electric motor, which method eliminates the need for an adaptation of the hydraulic system in order to avoid disturbing noises caused by pressure fluctuations in the hydraulic system. It is also a further object of one aspect of the invention to provide an inexpensive and uncomplex method of said type for operating an electric motor. It is a further object of one aspect of the invention to provide a delivery pump that can carry out a method of said type. Furthermore, a further object consists in providing a motor vehicle having at least one delivery pump of said type. Furthermore, a further object consists in providing a computer program. Furthermore, a further object consists in providing a computer-readable medium.

The objects relating to aspects of the method are achieved by a method of the type mentioned in the introduction, which is distinguished by the fact that a periodically repeating pressure fluctuation of the liquid that occurs during delivery operation is at least partially compensated by virtue of the rotational speed of the electric motor being manipulated in accordance with the periodically repeating pressure fluctuation. It is thus possible for the pressure fluctuations of the liquid to be at least partially or even approximately entirely compensated, without the need for the hydraulic system to be explicitly designed and dimensioned for this purpose. The hydraulic system comprises, in particular, liquid lines, pressure control valves, a displacement pump stage and/or a consumer to which the liquid is to be supplied. In particular, by way of its rotation, in particular by way of the rotation of its rotor, the electric motor drives the displacement pump stage. In other words, the rotational speed of the electric motor is proportional or identical to the rotational speed of the displacement pump stage. The liquid lines are for example formed from an elastomer or from some other elastic material. The consumer is for example a high-pressure fuel pump, injection nozzles, an internal combustion engine, a heater for an auxiliary heating system, or an assembly, to which coolant or lubricating oil is to be supplied, for a motor vehicle. Said assembly may be an internal combustion engine, an electric drive unit, for example an electrical axle, or a battery housing that is to be cooled.

The advantage in relation to a structural adaptation, in other words in relation to corresponding design and dimensioning, of the hydraulic system for the purposes of avoiding undesired acoustic vibrations and noises owing to pressure fluctuations of the delivered liquid is that there is no need for any structural adaptations whatsoever, which generate high costs with every vehicle produced. It is also possible for identical parts of the hydraulic system to be utilized across different model variants, because the method ensures that no undesired noises whatsoever occur owing to pressure fluctuations of the delivered liquid, or the generation of noise owing to pressure fluctuations is at least perceptibly reduced. In other words, aspects of the invention are distinguished by low complexity, ease of implementation, and associated low costs.

The manipulation of the rotational speed is in particular a manipulation of the rotational speed profile. It is particularly expedient if the manipulation of the rotational speed profile relates to the period of the periodically repeating pressure fluctuation.

Furthermore, the pressure fluctuation refers in particular to a pressure fluctuation profile. It is particularly expedient if the pressure fluctuation profile relates to the period of the periodically repeating pressure fluctuation.

Furthermore, the statement that the rotational speed of the electric motor is manipulated in accordance with the periodically repeating pressure fluctuation means that the rotational speed or the rotational speed profile is influenced in a manner dependent on the pressure fluctuation or the pressure fluctuation profile, in such a way that the periodically repeating pressure fluctuation or the pressure fluctuation profile is lowered.

A preferred exemplary embodiment is characterized by the fact that the manipulation comprises a periodically repeating lowering and/or raising of the rotational speed at least in certain ranges. This is a particularly simple way of manipulating the rotational speed, because a lowering of the rotational speed leads to a lowering, and a raising of the rotational speed leads to a raising, of the pressure of the delivered liquid. It is also advantageous if the period of the periodically repeating lowering and/or raising of the rotational speed differs from the period of the periodically repeating pressure fluctuation of the liquid that occurs during delivery operation. For example, the period of the periodically repeating pressure fluctuations of the liquid that occur during delivery operation corresponds to a multiple of the period of the periodically repeating lowering and/or raising of the rotational speed.

It is advantageous if the lowering and/or raising of the rotational speed is restricted to a rotational angle that is less than one full rotor revolution, that is to say 360°. In particular, the rotational angle to which the lowering and/or raising of the rotational speed is restricted is 60° or less.

It is also preferable if the rotational speed averaged over the period of the periodically repeating lowering and/or raising of the rotational speed is constant. It is alternatively possible that the rotational speed averaged over the period of the periodically repeating pressure fluctuations of the liquid that occur during delivery operation is constant.

In other words, the lowering or the raising of the rotational speed does not lead to a lowering or raising of the rotational speed averaged over the period of the periodically repeating lowering and/or raising of the rotational speed, or does not lead to a lowering or raising of the rotational speed averaged over the period of the periodically repeating pressure fluctuation. This is realized in particular by virtue of the fact that, within one period of the periodically repeating lowering and/or raising of the rotational speed, a lowering of the rotational speed is followed directly, or after a time delay, by a raising of the rotational speed. It is alternatively or additionally possible that a raising of the rotational speed is followed directly, or after a time delay, by a lowering of the rotational speed. Here, the magnitude and/or duration of the raising or of the lowering of the rotational speed is selected such that, averaged over the period of the periodically repeating pressure fluctuation, the temporary lowering or raising of the rotational speed is compensated.

A further preferred exemplary embodiment is characterized by the fact that the time, the time period and/or the magnitude of the manipulation of the rotational speed is determined by the periodically repeating pressure fluctuation of the liquid. In other words, the periodically repeating pressure fluctuations of the liquid determine for how long and to what degree the rotational speed is manipulated. By virtue of the fact that the manipulation of the rotational speed is based on the periodically repeating pressure fluctuations of the liquid, it is ensured that the manipulation of the rotational speed influences the periodically repeating pressure fluctuation of the liquid, specifically such that the periodically repeating pressure fluctuation of the liquid is reduced.

A further preferred exemplary embodiment is characterized by the fact that the time, the time period and/or the magnitude of the manipulation of the rotational speed is specified by at least one pressure sensor, in particular by a pressure value or pressure value profile measured by the pressure sensor, which ascertains the periodically repeating pressure fluctuation of the liquid at the outlet of the displacement pump stage, in the hydraulic system and/or at the consumer. In other words, pressure feedback control is performed, with which the periodically repeating pressure fluctuations of the liquid can be at least partially compensated.

It is particularly advantageous if the magnitude of the manipulation of the rotational speed is dependent on the magnitude of the pressure fluctuation of the liquid.

The periodically repeating pressure fluctuations of the liquid are caused in particular by the displacement pump, the hydraulic system and/or the consumer, for which reason it is particularly expedient for the pressure sensor to be arranged where the pressure fluctuations of the liquid originate. It is also advantageous if an existing pressure sensor is used for the pressure feedback control. For example, such pressure sensors are arranged in the common rail and/or downstream of a high-pressure fuel pump in a flow direction, in order to operate an associated fuel injection system using the fuel pressure prevailing there.

A further preferred exemplary embodiment is characterized by the fact that the time, the time period and/or the magnitude of the manipulation of the rotational speed is specified by a characteristic map. In this way, a pressure sensor, in particular a dedicated pressure sensor, for carrying out the method according to the invention can be omitted, which considerably lowers costs and complexity, in particular assembly complexity. The characteristic map is preferably ascertained experimentally by a test setup, which comprises the electric motor, the displacement pump stage, the hydraulic system and the consumer, and subsequently stored in a control unit.

It is particularly advantageous if the characteristic map stipulates the time, the time period and/or the magnitude of the manipulation of the rotational speed as a function of at least one variable. One of these variables is advantageously the delivery volume flow of the displacement pump stage, which is dependent on the rotational speed. It is also advantageous if a further variable corresponds to the delivery pressure ascertained by way of a current intensity with which electrical energy is supplied to a stator winding of the stator. In other words, it is possible for the characteristic map to be configured as a characteristic map, in particular as a multidimensional characteristic map. A further advantage of the use of a characteristic map in relation to the use of a pressure sensor is that, with the use of a characteristic map, the system complexity and thus costs are considerably lowered.

A further exemplary aspect is characterized by the fact that the manipulation of the rotational speed is performed by way of a manipulation of at least one phase voltage and/or of at least one phase current with which the electric motor is driven. In this way, the rotational speed of the electric motor can be manipulated particularly easily, without the need for outlay on external additional components, for example, for this purpose. In the case of the manipulation of the phase voltages, it is possible for the manipulation to be performed by variation of the voltage frequency and/or of the magnitude of the voltage. In particular in the case of permanently excited synchronous machines, the voltage frequency is proportional to the rotational speed of the electric motor, which means that the delivery volume flow of the pump stage can be influenced by the voltage frequency. In the case of a constant rotational speed, the current intensity in the case of a permanently excited synchronous machine that drives a pump stage, in particular a displacement pump stage, is proportional to the pressure generated by the displacement pump stage.

A further preferred exemplary aspect is characterized by the fact that the manipulation of the at least one phase voltage is performed by way of a superposition of a compensation voltage on the at least one phase voltage, and/or wherein the manipulation of the at least one phase current is performed by way of a superposition of a compensation current on the at least one phase current. Such a superposition gives rise particularly easily to a resulting phase voltage or a resulting phase current which gives rise to the desired manipulation of the rotor speed.

A further preferred exemplary aspect is characterized by the fact that a profile of the compensation voltage is phase-offset with respect to a profile of the at least one phase voltage with regard to an electrical period, and/or wherein a profile of the compensation current is phase-offset with respect to a profile of the at least one phase current with regard to an electrical period. By such a phase offset, it can be ensured that the manipulation of the rotor speed in the hydraulic system leads to a lowering of the pressure fluctuations of the liquid in the hydraulic system. It is ensured in this way that a resulting phase voltage or a resulting phase current leads to a manipulation of the rotor speed which results in a lowering of the pressure fluctuation of the liquid in the hydraulic system.

A further preferred exemplary aspect is characterized by the fact that the electric motor is configured as a permanently excited synchronous machine. Through the use of the method with an electric motor that is configured as a permanently excited synchronous machine, the implementation of the method according to the invention is significantly simplified. For example, the information regarding the rotor position that is available in the case of a permanently excited synchronous machine of said type can be utilized in order to targetedly manipulate the rotor speed in a manner dependent on the rotor position. Improved compensation of the pressure fluctuation of the liquid is achieved in this way.

A further preferred exemplary aspect is characterized by the fact that the electric motor is operated by way of block commutation, and wherein at least a phase voltage of a leading phase of the block commutation is lowered or raised. The use of block commutation results not only in a relatively expedient method for operating the electric motor but also in very easy implementation of the method according to the invention, by virtue of the fact that only a phase voltage of at least one leading phase of the block commutation is raised or lowered.

As an alternative to block commutation, it is possible for the electric motor to be operated using Field Oriented Control, FOC, that is to say using vector control. More exact control and associated acoustically quieter operation are thus conceivable.

A further preferred exemplary embodiment is characterized by the fact that the at least one phase voltage of a leading phase of the block commutation is manipulated by multiplication by a compensation factor from a characteristic map. Such multiplication has the advantage that a percental lowering or raising of the rotor speed can be performed as a function of a variable. At the same time, relatively little memory space and little processing power is required for this purpose. There are preferably multiple compensation factors for the phase voltages of the leading phases of the block commutation. It is particularly expedient if the respective compensation factor used is dependent on the temperature and/or the pressure of the liquid to be delivered. Alternatively or in addition, the respective compensation factor used may be dependent on the rotational speed.

A further preferred exemplary aspect is characterized by the fact that the at least one phase voltage of a leading phase of the block commutation is manipulated by addition or subtraction of a compensation factor from a characteristic map. This is used in addition or as an alternative to the multiplication by a compensation factor.

A further preferred exemplary aspect is characterized by the fact that a quantity of electrical energy saved as a result of the lowering of the rotational speed in relation to a constant rotational speed compensates, in particular substantially compensates, for a quantity of electrical energy additionally expended as a result of the raising of the rotational speed in relation to a constant rotational speed. Such a configuration of the method according to the invention allows highly energy-saving use of the method according to the invention. Such a compensation of the electrical energy in particular also relates to the period of the periodic repeating pressure fluctuation.

The object relating to the provision of a delivery pump is achieved through the provision of a delivery pump having a displacement pump stage, having an electric motor for driving the displacement pump stage, having a control unit for operating the electric motor, and having elements that are suitable for carrying out the steps of the method according to the invention.

It is particularly advantageous if the displacement pump stage is a gerotor pump stage. Alternatively, the displacement pump stage is a screw pump. It is furthermore advantageous if the electric motor is a permanently excited synchronous machine. The control unit is preferably a dedicated control unit for operating the electric motor. As an alternative to this, it is conceivable for the control unit to be an engine control unit for operating an internal combustion engine.

A further preferred exemplary embodiment is characterized by the fact that the delivery pump is configured as a coolant pump, as a fuel pump or as an oil pump. In accordance with its design, the displacement pump is resistant to a coolant, fuel or oil that is to be delivered.

The object relating to the provision of a motor vehicle is achieved in that a motor vehicle having at least one delivery pump according to the invention is provided.

The object relating to the provision of a computer program is achieved through the provision of a computer program comprising commands that cause the delivery pump according to the invention to carry out the method steps of the method according to one aspect of the invention.

The object relating to the provision of a computer program is achieved in that a computer-readable medium on which the computer program according to one aspect of the invention is stored is provided.

Advantageous refinements of the present invention are described in the dependent claims and in the following description of the figures.

BRIEF DESCRIPTION OF THE DRAWINGS

The invention will be discussed in detail below on the basis of exemplary embodiments with reference to the drawings. In the drawings.

DETAILED DESCRIPTION OF THE PRESENTLY PREFERRED EMBODIMENTS

Figure 1A:
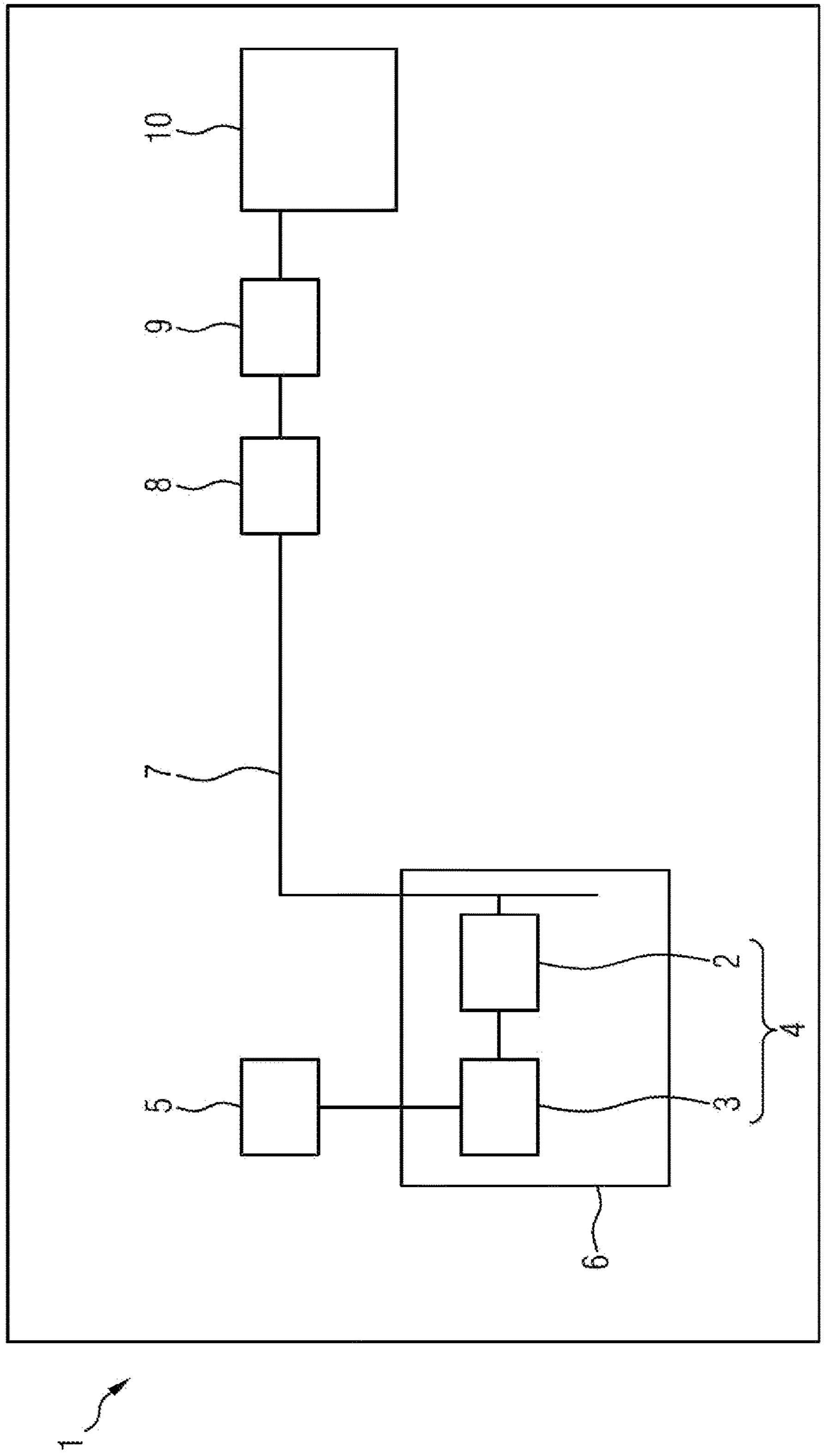
FIG. 1A is a first motor vehicle.

FIG. 1*a* shows a motor vehicle 1 having a delivery pump 4 according to one aspect of the invention, wherein the delivery pump 4 has a displacement pump stage 2 and an electric motor 3 for driving the displacement pump stage 2. A control unit 5 for operating the electric motor 3 is connected to the electric motor 3. The delivery pump 4 is configured as a fuel pump that is arranged in a fuel tank 6. The electric motor 3 is configured as a permanently excited synchronous machine, whilst the displacement pump stage 2 is configured as a gerotor pump stage. By the delivery pump 4, fuel can be delivered through a fuel line 7 from the fuel tank 6 to a high-pressure fuel pump 8, from there to an injection system 9, and from there to an internal combustion engine 10. Due to the elasticity of the fuel line 7 and the pulsing operation of the injection system 9, the high-pressure fuel pump 8 and the displacement pump stage 2, periodically repeating pressure fluctuations of the delivered fuel occur during the operation of the delivery pump 4. The method according to one aspect of the invention is stored as a computer program, which comprises commands that cause the delivery pump 4 to carry out the method according to the invention, in the control unit 5. The periodically repeating pressure fluctuations can be at least reduced by way of the method according to one aspect of the invention. FIG. 1*a* illustrates an example without the use of a pressure sensor, which means that the method according to one aspect of the invention is implemented using a characteristic map ascertained in advance on a test stand.

Figure 1B:
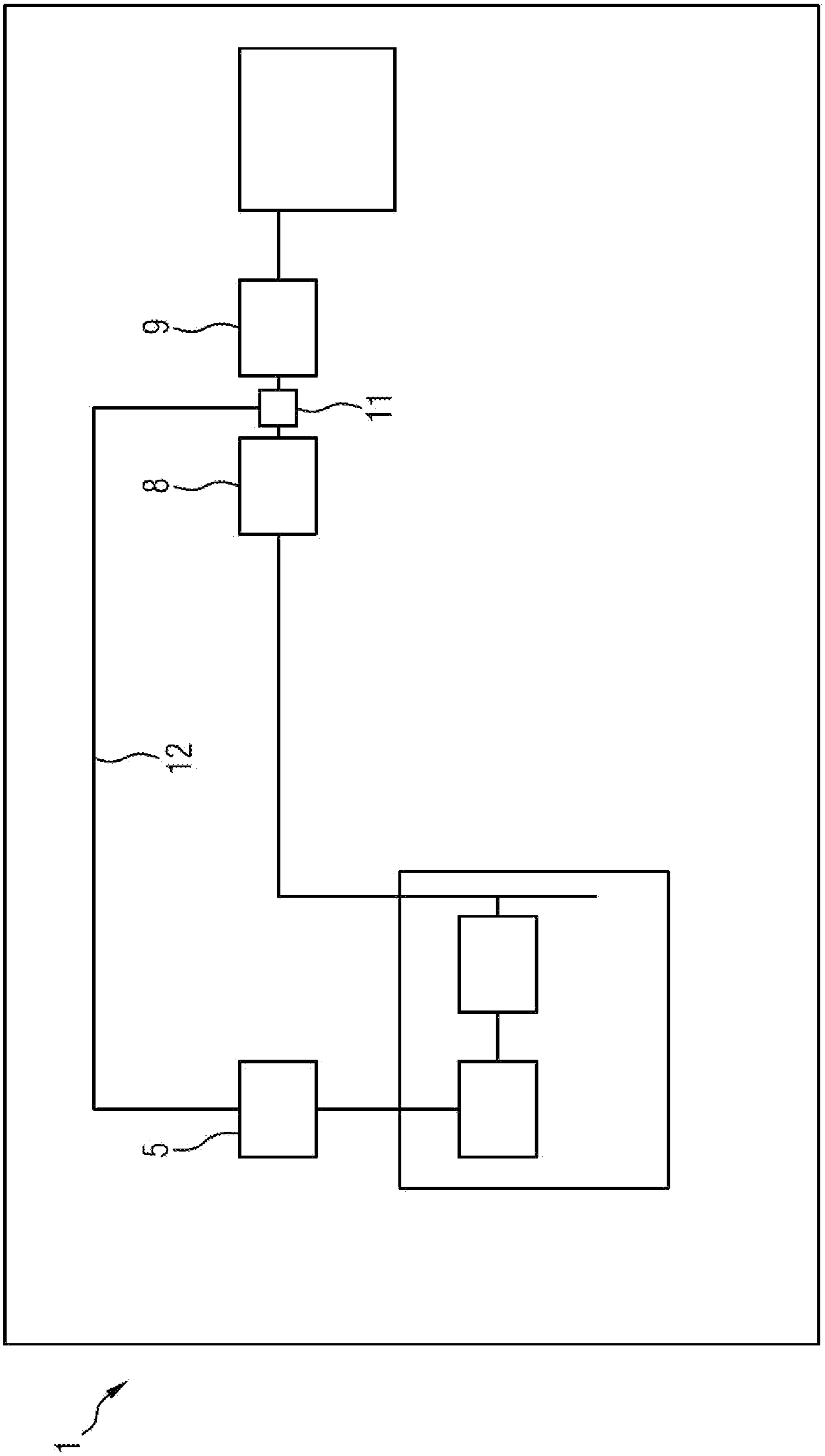
FIG. 1B is a motor vehicle.

FIG. 1*b* differs from FIG. 1*a* in that a pressure sensor 11 is used for carrying out the method according to one aspect of the invention. The pressure sensor 11 measures the fuel pressure downstream of the high-pressure fuel pump 8 and upstream of the injection system 9. The measured fuel pressure signal, from which information relating to the periodically repeating pressure fluctuations of the fuel can be ascertained, is transmitted via the signal line 12 to the control unit 5 and is used for the method according to one aspect of the invention. In other words, in this variant, no characteristic map ascertained in advance on a test stand is required for carrying out the method according to one aspect of the invention.

Figure 2A:
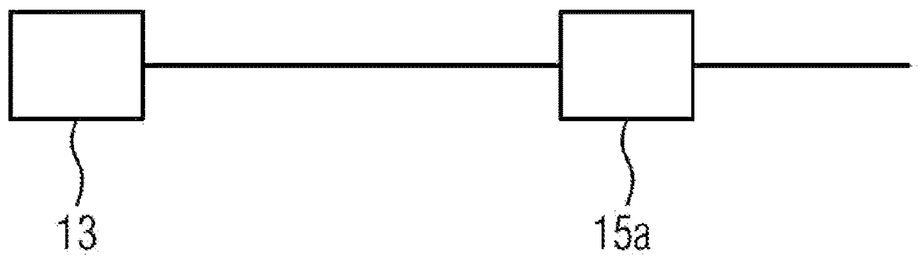
FIG. 2A is a method from the prior art.

FIG. 2*a* illustrates a method from the prior art for operating a delivery pump that comprises an electric motor and a displacement pump stage that is driven by the electric motor. A rotational speed 13 is demanded for example by an internal combustion engine that is to be supplied with fuel. This demanded rotational speed 13 corresponds to the unmanipulated rotational speed 15*a,* for which reason pressure fluctuations may arise in the hydraulic system.

Figure 2B:
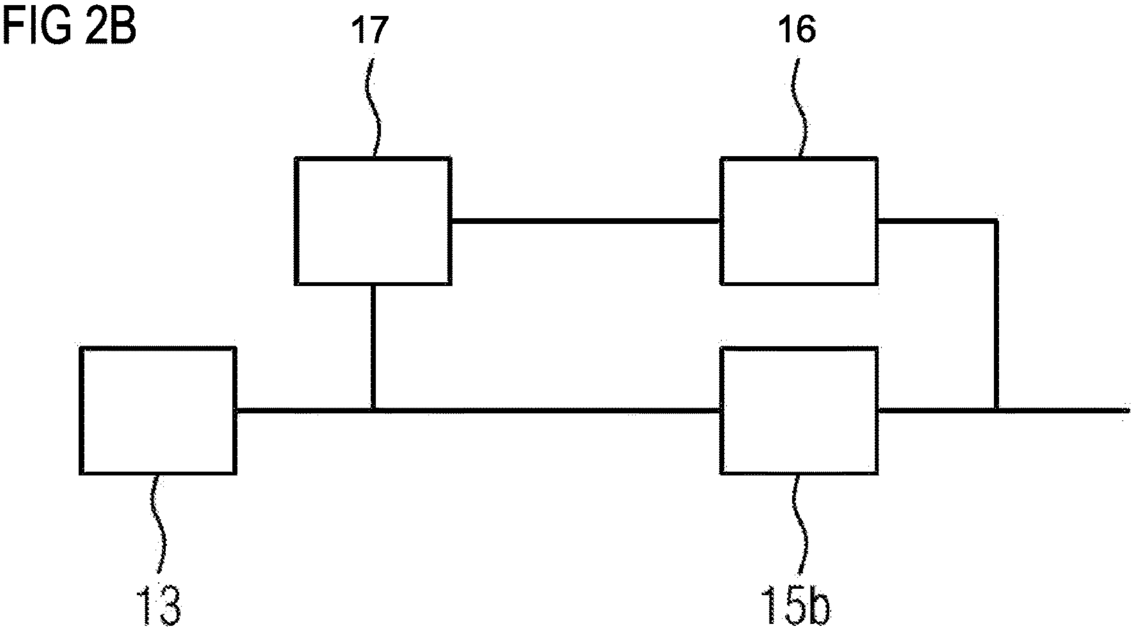
FIG. 2B is a method.

FIG. 2*b* shows a first variant of the method according to the invention. As in the method in FIG. 2*a*, a rotational speed 13 is demanded. This rotational speed 13 is however changed by way of pressure fluctuation compensation feedback control 17 into a manipulated rotational speed 15*b*. The pressure fluctuation compensation feedback control 17 is performed by way of a pressure profile measurement 16, which may be performed for example by a pressure sensor as illustrated in FIG. 1*b*. In this way, it is possible to ascertain the periodically repeating pressure fluctuations in the hydraulic system and utilize these for the pressure fluctuation compensation feedback control 17, that is to say for the manipulation of the rotational speed, which leads to the manipulated rotational speed 15*b,* which results in a lowering of the periodic repeating pressure fluctuations in the hydraulic system.

Figure 2C:
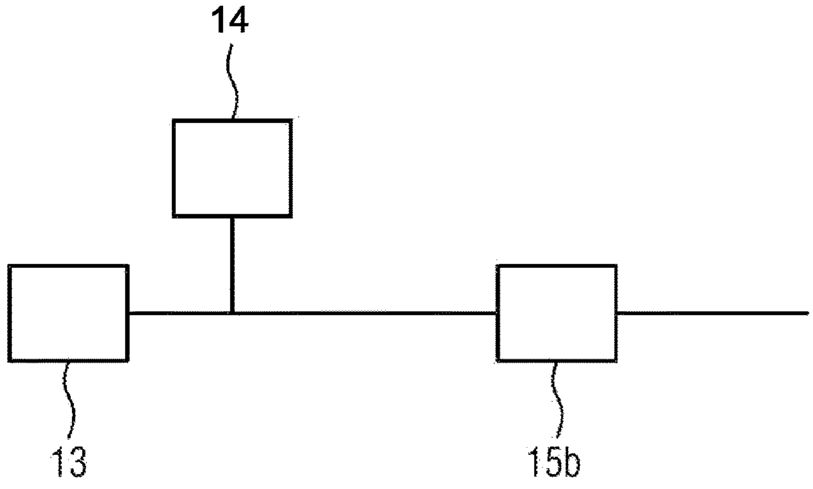
FIG. 2C is a method.

The method illustrated in FIG. 2*c* corresponds to a second variant of the method according to one aspect of the invention. It differs in particular from the method illustrated in FIG. 2*b* in that pressure fluctuation compensation feedback control is omitted, which makes it possible to use the setup illustrated in FIG. 1*a* because, here, the pressure measurement by a pressure sensor is omitted. This not only leads to a simpler and less expensive setup but also, if the method illustrated here is implemented in an existing control unit for operating the delivery pump, requires less processing power than the method illustrated in FIG. 2*b*. In the method illustrated here, as is already the case in the methods from FIGS. 2*a* and 2*b*, a rotational speed 13 is demanded, but by contrast to the method from FIG. 2*b*, said rotational speed is changed, by a characteristic map 14 ascertained experimentally in advance, to the manipulated rotational speed 15*b,* which lowers periodically repeating pressure fluctuations in the hydraulic system relative to the method from FIG. 2*a*.

Figure 3:
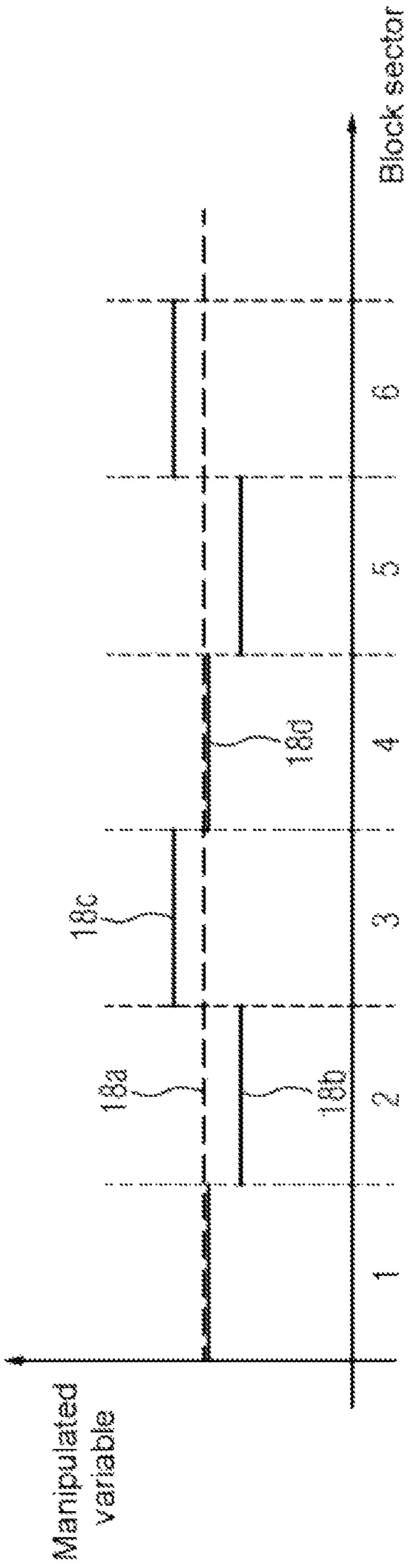
FIG. 3 is a manipulation of the rotational speed of the method.

FIG. 3 illustrates a specific embodiment of the manipulation of the rotational speed by a characteristic map, as may be used during exemplary operation by way of block commutation. The characteristic map on which the manipulation of the rotational speed in FIG. 2*c* is based has compensation factors ascertained experimentally in advance, which compensation factors are, in a manner dependent on the rotor position, multiplied by the respective normal manipulated variable profile 18*a* for the demanded setpoint rotational speed, which can lead, in a manner dependent on the rotor position, to a manipulated variable 18*b* that is lowered in certain segments, a manipulated variable profile 18*c* that is raised in certain segments, or a manipulated variable profile 18*d* that is unchanged in certain segments, in relation to the respective normal manipulated variable profile 18*a*. The respective manipulated variable profile 18*a,* 18*b,* 18*c,* 18*d* is in each case the phase voltage of a leading phase during operation by way of block commutation.

Figure 4A:
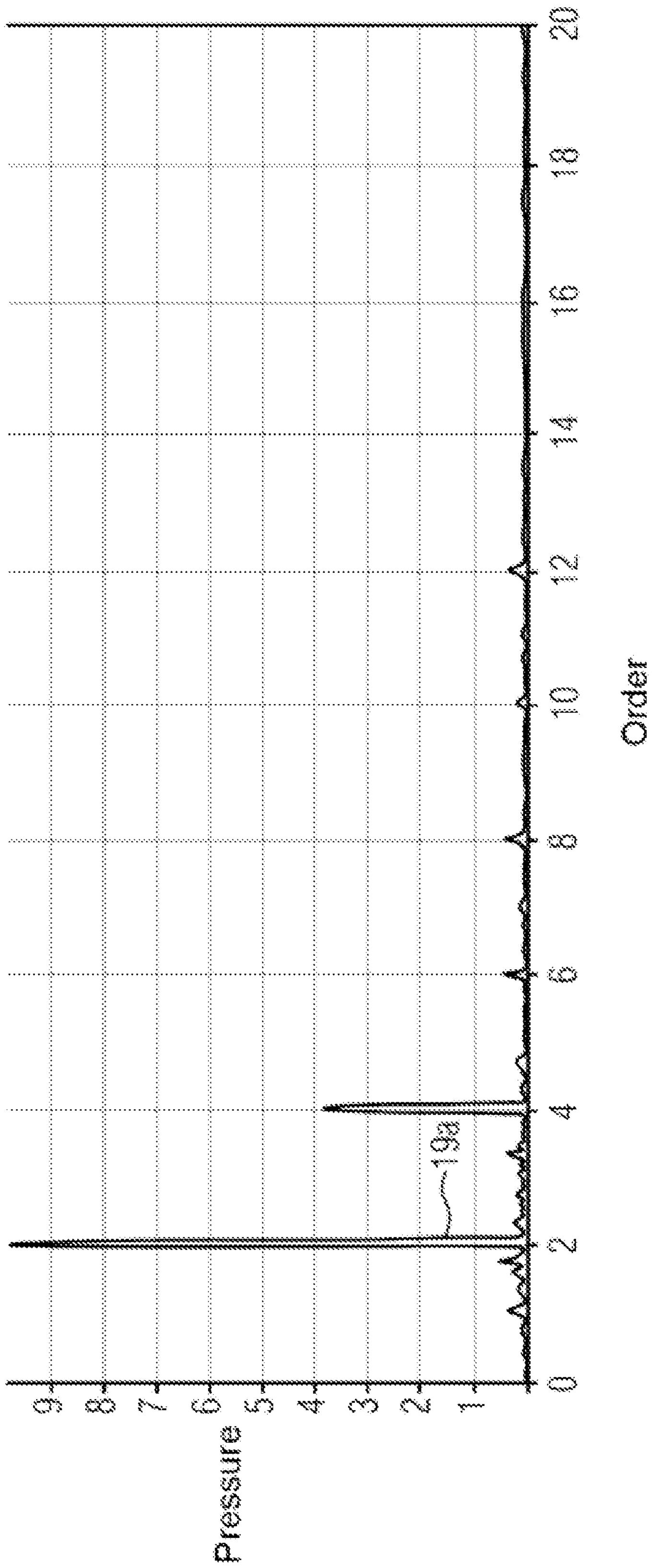
FIG. 4A is a graph of frequency-dependent pressure fluctuations.

FIG. 4*a* shows frequency-dependent pressure fluctuations of a hydraulic system without the use of the method according to the invention. It is possible to clearly see a frequency-dependent pressure peak 19*a* one aspect of that arises in the hydraulic system at a 2nd order frequency.

Figure 4B:
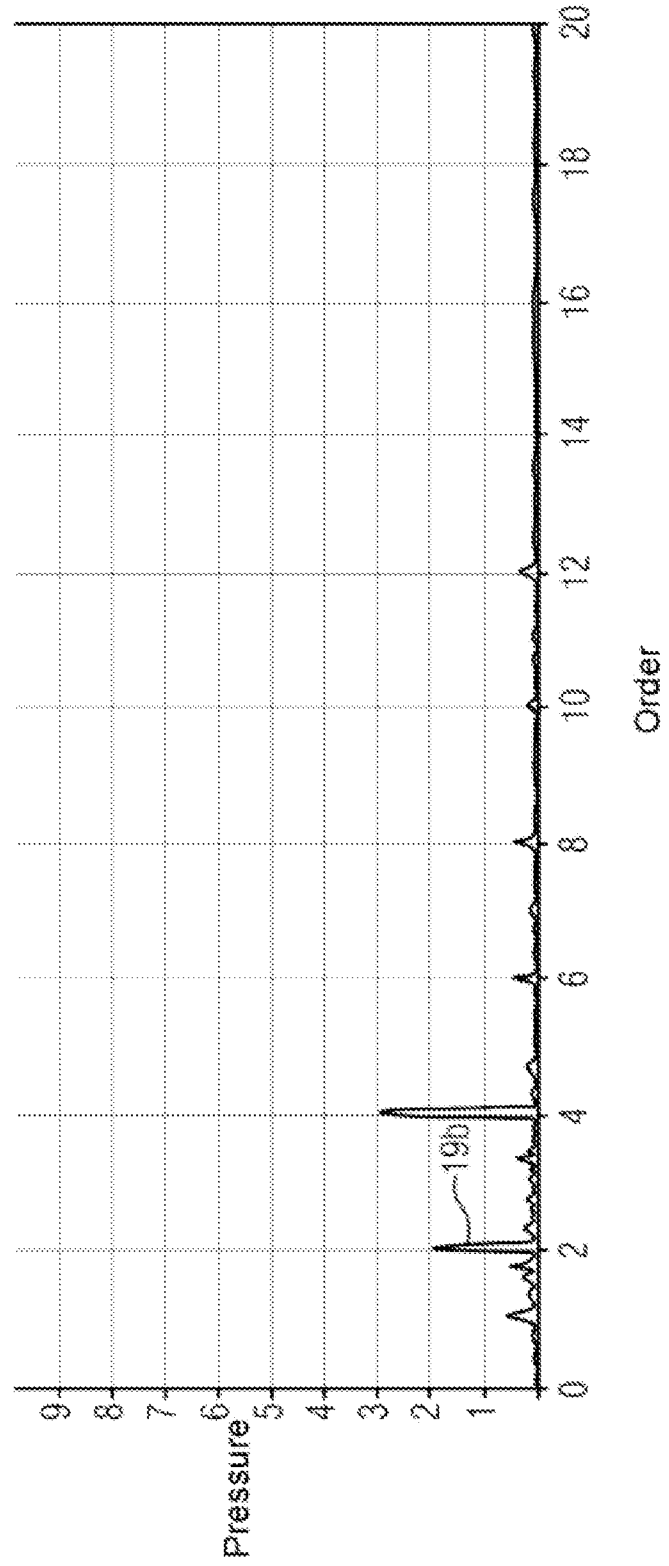
FIG. 4B is a lowering of frequency-dependent pressure fluctuations.

FIG. 4*b* shows a lowering of frequency-dependent pressure fluctuations in the same hydraulic system from FIG. 4*a* by way of the second method, as illustrated in FIG. 2*c*. This has the result that the frequency-dependent pressure peak as illustrated in FIG. 4*a* becomes a lowered frequency-dependent pressure peak 19*b*.

The exemplary embodiments of FIGS. 1*a* to 4*b* are in particular not of a limiting nature and serve to illustrate the concept of the invention. The different features of the individual exemplary embodiments may be combined with one another as desired.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating an electric motor that drives a displacement pump stage to deliver a liquid through a hydraulic system and supply the liquid to at least one consumer, comprising compensating, at least partially, a periodically repeating pressure fluctuation of the liquid that occurs during delivery operation; and manipulating a rotational speed of the electric motor in accordance with the periodically repeating pressure fluctuation, wherein a time, a time period, and/or a magnitude of the manipulation of the rotational speed is determined by the periodically repeating pressure fluctuation of the liquid, wherein the time, the time period, and/or the magnitude of the manipulation of the rotational speed is specified by at least one pressure sensor that ascertains the periodically repeating pressure fluctuation of the liquid at an outlet of the displacement pump stage, in the hydraulic system and/or at the at least one consumer.

2. The method as claimed in claim 1, wherein the manipulation comprises a periodically repeating lowering and/or raising of the rotational speed.

3. The method as claimed in claim 1, wherein the manipulation of the rotational speed is performed by a manipulation of at least one phase voltage and/or of at least one phase current with which the electric motor is driven.

4. The method as claimed in claim 1, wherein the electric motor is configured as a permanently excited synchronous machine.

5. The method as claimed in claim 1, wherein a quantity of electrical energy saved as a result of a lowering of the rotational speed in relation to a constant rotational speed compensates for a quantity of electrical energy additionally expended as a result of the raising of the rotational speed in relation to a constant rotational speed.

6. A method for operating an electric motor that drives a displacement pump stage to deliver a liquid through a hydraulic system and supply the liquid to at least one consumer, comprising:

compensating, at least partially, a periodically repeating pressure fluctuation of the liquid that occurs during delivery operation; and manipulating a rotational speed of the electric motor in accordance with the periodically repeating pressure fluctuation, wherein a time, a time period, and/or a magnitude of the manipulation of the rotational speed is determined by the periodically repeating pressure fluctuation of the liquid, wherein the time, the time period, and/or the magnitude of the manipulation of the rotational speed is specified by a characteristic map.

7. A method for operating an electric motor that drives a displacement pump stage to deliver a liquid through a hydraulic system and supply the liquid to at least one consumer, comprising compensating, at least partially, a periodically repeating pressure fluctuation of the liquid that occurs during delivery operation; and manipulating a rotational speed of the electric motor in accordance with the periodically repeating pressure fluctuation, wherein the manipulation of the rotational speed is performed by a manipulation of at least one phase voltage and/or of at least one phase current with which the electric motor is driven, wherein the manipulation of the at least one phase voltage is performed by a superposition of a compensation voltage on the at least one phase voltage, and/or wherein the manipulation of the at least one phase current is performed by the superposition of the compensation current on the at least one phase current.

8. The method as claimed in claim 7, wherein a profile of the compensation voltage is phase-offset with respect to a profile of the at least one phase voltage with regard to an electrical period, and/or wherein a profile of the compensation current is phase-offset with respect to a profile of the at least one phase current with regard to an electrical period.

9. A method for operating an electric motor that drives a displacement pump stage to deliver a liquid through a hydraulic system and supply the liquid to at least one consumer, comprising compensating, at least partially, a periodically repeating pressure fluctuation of the liquid that occurs during delivery operation; and manipulating a rotational speed of the electric motor in accordance with the periodically repeating pressure fluctuation' wherein the electric motor is operated by block commutation, and wherein at least a phase voltage of a leading phase of the block commutation is lowered or raised.

10. The method as claimed in claim 9, wherein the at least one phase voltage of a leading phase of the block commutation is manipulated by multiplication by a compensation factor from a characteristic map.

11. The method as claimed in claim 9, wherein the at least one phase voltage of a leading phase of the block commutation is manipulated by addition or subtraction of a compensation value from a characteristic map.

12. A delivery pump configured to deliver a liquid through a hydraulic system and supply the liquid to at least one consumer, comprising:

a displacement pump stage, having an electric motor that drives the displacement pump stage;

a control unit configured to operate the electric motor, configured to compensate, at least partially, a periodically repeating pressure fluctuation of the liquid that occurs during a delivery operation; and manipulate a rotational speed of the electric motor in accordance with the periodically repeating pressure fluctuation, wherein the manipulation comprises one of:

(A)

wherein a time, a time period, and/or a magnitude of the manipulation of the rotational speed is determined by the periodically repeating pressure fluctuation of the liquid, wherein the time, the time period, and/or the magnitude of the manipulation of the rotational speed is specified by at least one pressure sensor that ascertains the periodically repeating pressure fluctuation of the liquid at an outlet of the displacement pump stage, in the hydraulic system and/or at the at least one consumer;

(B)

wherein the time, the time period, and/or the magnitude of the manipulation of the rotational speed is determined by the periodically repeating pressure fluctuation of the liquid, wherein the time, the time period, and/or the magnitude of the manipulation of the rotational speed is specified by a characteristic map;

(C)

wherein the manipulation of the rotational speed is performed by a manipulation of at least one phase voltage and/or of at least one phase current with which the electric motor is driven, wherein the manipulation of the at least one phase voltage is performed by a superposition of a compensation voltage on the at least one phase voltage, and/or wherein the manipulation of the at least one phase current is performed by the superposition of the compensation current on the at least one phase current, wherein the manipulation of the at least one phase voltage is performed by a superposition of a compensation voltage on the at least one phase voltage, and/or wherein the manipulation of the at least one phase current is performed by the superposition of the compensation current on the at least one phase current; and (D)

wherein the manipulation of the rotational speed is performed by the manipulation of at least one phase voltage and/or of the at least one phase current with which the electric motor is driven, wherein the manipulation of the at least one phase voltage is performed by a superposition of a compensation voltage on the at least one phase voltage, and/or wherein the manipulation of the at least one phase current is performed by the superposition of the compensation current on the at least one phase current.

13. The delivery pump as claimed in claim 12, wherein the delivery pump is configured as a coolant pump, a fuel pump, or an oil pump.

14. A motor vehicle having at least one delivery pump configured to deliver a liquid through a hydraulic system and supply the liquid to at least one consumer, comprising:

a displacement pump stage, having an electric motor that drives the displacement pump stage;

a control unit configured to operate the electric motor, configured to compensate, at least partially, a periodically repeating pressure fluctuation of the liquid that occurs during a delivery operation; and manipulate a rotational speed of the electric motor in accordance with the periodically repeating pressure fluctuation, wherein the manipulation comprises one of:

(A)

wherein a time, a time period, and/or a magnitude of the manipulation of the rotational speed is determined by the periodically repeating pressure fluctuation of the liquid, wherein the time, the time period, and/or the magnitude of the manipulation of the rotational speed is specified by at least one pressure sensor that ascertains the periodically repeating pressure fluctuation of the liquid at an outlet of the displacement pump stage, in the hydraulic system and/or at the at least one consumer;

(B)

wherein the time, the time period, and/or the magnitude of the manipulation of the rotational speed is determined by the periodically repeating pressure fluctuation of the liquid, wherein the time, the time period, and/or the magnitude of the manipulation of the rotational speed is specified by a characteristic map;

(C)

wherein the manipulation of the rotational speed is performed by a manipulation of at least one phase voltage and/or of at least one phase current with which the electric motor is driven, wherein the manipulation of the at least one phase voltage is performed by a superposition of a compensation voltage on the at least one phase voltage, and/or wherein the manipulation of the at least one phase current is performed by the superposition of the compensation current on the at least one phase current, wherein the manipulation of the at least one phase voltage is performed by a superposition of a compensation voltage on the at least one phase voltage, and/or wherein the manipulation of the at least one phase current is performed by the superposition of the compensation current on the at least one phase current; and (D)

wherein the manipulation of the rotational speed is performed by the manipulation of at least one phase voltage and/or of the at least one phase current with which the electric motor is driven, wherein the manipulation of the at least one phase voltage is performed by a superposition of a compensation voltage on the at least one phase voltage, and/or wherein the manipulation of the at least one phase current is performed by the superposition of the compensation current on the at least one phase current.

15. A computer program stored on a nontransitory computer readable medium comprising commands that cause a delivery pump to deliver a liquid through a hydraulic system and supply the liquid to at least one consumer, comprising:

compensating, at least partially, a periodically repeating pressure fluctuation of the liquid that occurs during delivery operation; and manipulating a rotational speed of an electric motor in accordance with the periodically repeating pressure fluctuation, wherein the manipulation comprises one of:

(A)

wherein a time, a time period, and/or a magnitude of the manipulation of the rotational speed is determined by the periodically repeating pressure fluctuation of the liquid, wherein the time, the time period, and/or the magnitude of the manipulation of the rotational speed is specified by at least one pressure sensor that ascertains the periodically repeating pressure fluctuation of the liquid at an outlet of a displacement pump stage, in the hydraulic system and/or at the at least one consumer;

(B)

wherein the time, the time period, and/or the magnitude of the manipulation of the rotational speed is determined by the periodically repeating pressure fluctuation of the liquid, wherein the time, the time period, and/or the magnitude of the manipulation of the rotational speed is specified by a characteristic map;

(C)

wherein the manipulation of the rotational speed is performed by a manipulation of at least one phase voltage and/or of at least one phase current with which the electric motor is driven, wherein the manipulation of the at least one phase voltage is performed by a superposition of a compensation voltage on the at least one phase voltage, and/or wherein the manipulation of the at least one phase current is performed by the superposition of the compensation current on the at least one phase current, wherein the manipulation of the at least one phase voltage is performed by a superposition of a compensation voltage on the at least one phase voltage, and/or wherein the manipulation of the at least one phase current is performed by the superposition of the compensation current on the at least one phase current; and (D)

wherein the manipulation of the rotational speed is performed by the manipulation of at least one phase voltage and/or of the at least one phase current with which the electric motor is driven, wherein the manipulation of the at least one phase voltage is performed by a superposition of a compensation voltage on the at least one phase voltage, and/or wherein the manipulation of the at least one phase current is performed by the superposition of the compensation current on the at least one phase current.

16. A nontransitory computer-readable medium on which the computer program as claimed in claim 15 is stored.

* * * * *